US012644589B2

(12) United States Patent
Liang

(10) Patent No.: US 12,644,589 B2
(45) Date of Patent: Jun. 2, 2026

(54) SIMPLE AND PORTABLE CAMPING LIGHT

(71) Applicant: TAIZHOU WANCHANG ELECTRONIC TECHNOLOGY CO., LTD., Taizhou (CN)

(72) Inventor: Lu Liang, Shangqiu (CN)

(73) Assignee: TAIZHOU WANCHANG ELECTRONIC TECHNOLOGY CO., LTD., Taizhou (CN)

( * ) Notice: Subject to any disclaimer, the term of this patent is extended or adjusted under 35 U.S.C. 154(b) by 0 days.

(21) Appl. No.: 19/173,761

(22) Filed: Apr. 8, 2025

(65) Prior Publication Data

US 2026/0055885 A1 Feb. 26, 2026

(30) Foreign Application Priority Data

Aug. 26, 2024 (CN) ........................ 202422085864.X

(51) Int. Cl.
*F21V 27/00* (2006.01)
*F21L 14/00* (2006.01)

(52) U.S. Cl.
CPC ............ *F21V 27/005* (2013.01); *F21L 14/00* (2013.01)

(58) Field of Classification Search
CPC ............................ F21V 27/005; F21V 114/00
See application file for complete search history.

(56) References Cited

U.S. PATENT DOCUMENTS

| | | | | |
|---|---|---|---|---|
| 9,478,963 B1 * | 10/2016 | Klein | | H02G 11/02 |
| 12,111,041 B2 * | 10/2024 | Bley | | F21V 21/38 |
| 2014/0233234 A1 * | 8/2014 | Bokun | | F21V 17/007 362/249.06 |
| 2017/0213431 A1 * | 7/2017 | Huo | | B65H 75/4492 |
| 2021/0126410 A1 * | 4/2021 | Thomas | | H02G 11/02 |

FOREIGN PATENT DOCUMENTS

| | | | | |
|---|---|---|---|---|
| CN | 219014238 U | | 5/2023 | |
| JP | 2002260405 A | * | 9/2002 | F21V 17/007 |
| KR | 200341922 Y1 | * | 2/2004 | F21V 27/02 |
| KR | 20090050033 A | * | 5/2009 | F21V 21/16 |
| KR | 102081676 B1 | * | 4/2020 | B65H 75/44 |

* cited by examiner

*Primary Examiner* — Zheng Song
(74) *Attorney, Agent, or Firm* — FIDELI LAW PLLC

(57) ABSTRACT

A simple and portable camping light is provided, which aims to provide a simple and portable camping light that is simple in structure and convenient to assemble and disassemble. A key point of the technical solution is that a rotary plate matched with a second wire winding disk is arranged at a bottom end of a winding reel; the second wire winding disk is rotatably connected to a first wire winding disk; and the winding reel can be of an integrally formed structure and is fixedly connected to the first wire winding disk; or the winding reel can be of a detachable structure and includes an upper reel body and a lower reel body. The camping light is simple in structure, and a light string can be orderly collected. Different structural designs of the winding reel meet a variety of usage needs, and the components are connected stably.

8 Claims, 6 Drawing Sheets

SIMPLE AND PORTABLE CAMPING LIGHT

RELATED APPLICATIONS

The present patent document claims the benefit of priority to Patent Application No. 202422085864.X, filed Aug. 26, 2024, and entitled "SIMPLE AND PORTABLE CAMPING LIGHT," the entire contents of each of which are incorporated herein by reference.

BACKGROUND

1. Technical Field

The present disclosure relates to the field of lighting equipment, and in particular, to a simple and portable camping light that is simple in structure and is convenient to assemble and disassemble.

2. Background Information

A traditional camping light usually uses an integrated design on a power supply and a wire. This structure poses some inconveniences during use and storage. Due to the integrated design, the camping light has a large volume and is inconvenient to carry and store. Meanwhile, a length of the wire is fixed and cannot be adjusted according to an actual need, which limits a range of application of the camping light. In addition, when the wire is damaged, the entire camping light may not function properly, causing higher repair costs. Therefore, in order to meet needs of people for portability and flexibility of the camping light, it is necessary to develop a simple and portable camping light in which a power source and a wire are separatable.

BRIEF SUMMARY

For the shortcomings in the prior art, the present disclosure aims to provide a simple and portable camping light that is simple in structure and is convenient to assemble and disassemble.

In order to achieve the above objective, the present disclosure provides the following technical solution: A simple and portable camping light includes a winding reel for collecting a light string, a first wire winding disk and a second wire winding disk which are oppositely arranged on the winding reel in an up and down manner, a winding disk clamp arranged between the first wire winding disk and the second wire winding disk, and a wire tightening shaft arranged on the first wire winding disk, wherein a rotary plate matched with the second wire winding disk is arranged at a bottom end of the winding reel; the rotary plate is fixedly connected to the winding reel; and the second wire winding disk is detachably connected to the winding reel.

By use of the above technical solution, orderly collection of a light string is achieved. Due to the cooperation of the winding reel, the first wire winding disk, the second wire winding disk, and the winding disk clamp, it can be convenient to arrange and store the light string, making the light string convenient to carry and use. Due to the fixed connection between the rotary plate and the winding reel and the ability of the second wire winding disk to rotate relative to the first wire winding disk, it is convenient to tighten and loosen the light string. A power source device can be mounted on the first wire winding disk, which is convenient to assemble and maintain and has good practicability.

In a further setting of the present disclosure, through holes are provided in a peripheral side of the first wire winding disk, and matching through holes are provided in the rotary plate and the second wire winding disk; the wire tightening shaft is telescopically connected to the first wire winding disk; when stretched downwards, the wire tightening shaft is in contact with the second wire winding disk to lock the winding reel; and when contracted upwards, the wire tightening shaft is clamped with the through holes of the first wire winding disk to fix the wire tightening shaft.

By use of the above technical solution, a stretching and contraction function of the wire tightening shaft is achieved, so that the camping light is more flexible and convenient during use and storage. When stretched downwards, the wire tightening shaft is in contact with the second wire winding disk, so that the wire winding disk can be locked to ensure that the light string cannot be loosened during use. When contracted upwards, the wire tightening shaft is clamped with the through holes of the first wire winding disk, so that the wire tightening shaft can be fixed and avoided from moving freely, which ensures the stability of the camping light.

In a further setting of the present disclosure, the winding disk clamp is "L"-shaped, and a matching fixing part is arranged at a bottom end of the second wire winding disk, so that a bottom of the winding disk clamp is in plugged connection to the fixing part; a top of the winding disk clamp is inwards provided with a protrusion; and the first wire winding disk is in contact with a corner formed by the top of the winding disk clamp.

By use of the above technical solution, the winding disk clamp can be stably fixed on the second wire winding disk and is not easily loosened. The inward protrusion at the top of the winding disk clamp and the first wire winding disk are in contact with the corner at the top of the winding disk clamp, which can further improve the stability of the winding disk clamp and ensure that the winding disk clamp can firmly keep the position during winding of the light string.

In a further setting of the present disclosure, a slot is provided in the winding disk clamp, and a light string connection plate is arranged inside the slot; the light string connection plate is provided with a plug for connecting the winding disk clamp; the winding disk clamp is provided with a limiting portion opposite to the light string connection plate, and the limiting portion is in contact with the light string connection plate; and the winding disk clamp is detachably connected to the light string connection plate.

By use of the above technical solution, due to the arrangement of the slot in the winding disk clamp and the arrangement of the light string connection plate, it can be more convenient to connect the light string to the winding disk clamp, which improves the stability and reliability of connection. The arrangement of the limiting portion can limit the position of the light string connection plate, which prevents the light string connection plate from moving or falling off during use and ensures the stability of winding of the light string.

In a further setting of the present disclosure, the winding reel is of an integrally formed structure, and the winding reel is fixedly connected to the first wire winding disk.

By use of the above technical solution, the integrally formed structure makes the winding reel have a higher integrity and a more stable structure, which can better protect the light string and other components inside. The winding reel is fixedly connected to the first wire winding disk, which ensures the stability of the wire winding disk during use and avoids looseness or falling, thereby ensuring that the light string can be stably wound on the wire winding disk.

In a further setting of the present disclosure, the winding reel is of a detachable structure; the winding reel comprises an upper reel body and a lower reel body; the rotary plate is arranged at a bottom end of the lower reel body; and the upper reel body is detachably connected to both the lower reel body and the first wire winding disk.

By use of the above technical solution, the detachable structure makes it more convenient to transport and store the winding reel, occupies a smaller space, and is convenient to carry. The upper reel body and the lower reel body are detachably connected to the first wire winding disk, which facilitates maintenance and repair of the inside of the camping light. This design improves the flexibility of the camping light, and a user can remove or mount the winding reel according to a need to meet different usage needs.

In a further setting of the present disclosure, plugging buckles are arranged at two ends of the lower reel body, and plugging buckle grooves are oppositely arranged on the upper reel body; the upper reel body and the lower reel body are connected by plugging; the upper reel body and the first wire winding disk are oppositely provided with wire outlet slots, and the wire outlet slots are arranged on a peripheral side of the upper reel body and an inner side of the first wire winding disk; rotating buckles are arranged at two ends of the upper reel body, and matching rotating buckle grooves are provided in the first wire winding disk; and when the rotating buckles are plugged into the rotating buckle grooves, the first wire winding disk is rotated to fix the first wire winding disk and the upper reel body.

By use of the above technical solution, the wire outlet slots facilitate lead-out and arrangement of the light string, so that the light string can be orderly led out of the winding reel. Due to the cooperation between the rotating buckles and the rotating buckle grooves, the first wire winding disk and the upper reel body can be firmly fixed together, which improves the stability of the whole mechanism. The connection mode is simple and reliable and is convenient for mounting and removal.

In a further setting of the present disclosure, a groove is further provided in a peripheral side of the lower reel body, and a protrusion opposite to the groove is also arranged on the upper reel body; and the groove and the protrusion are plugged vertically to fix a position of the winding reel.

By use of the above technical solution, the overall stability of the winding reel can be improved, which ensures that the winding reel does not have looseness or deformation in a winding process of the light string.

In a further setting of the present disclosure, the first wire winding disk, the rotary plate, and the second wire winding disk are all provided with hollow structures.

By use of the above technical solution, the hollow structures can reduce the amount of materials for the first wire winding disk, the rotary plate, and the second wire winding disk, thereby reducing the weight of the entire winding mechanism and facilitating carrying and use. The hollow design contributes to air circulation, which can better dissipate heat generated during work of the light string, avoid accumulation of the heat, and prolong the service life of the light string.

Figure 1:
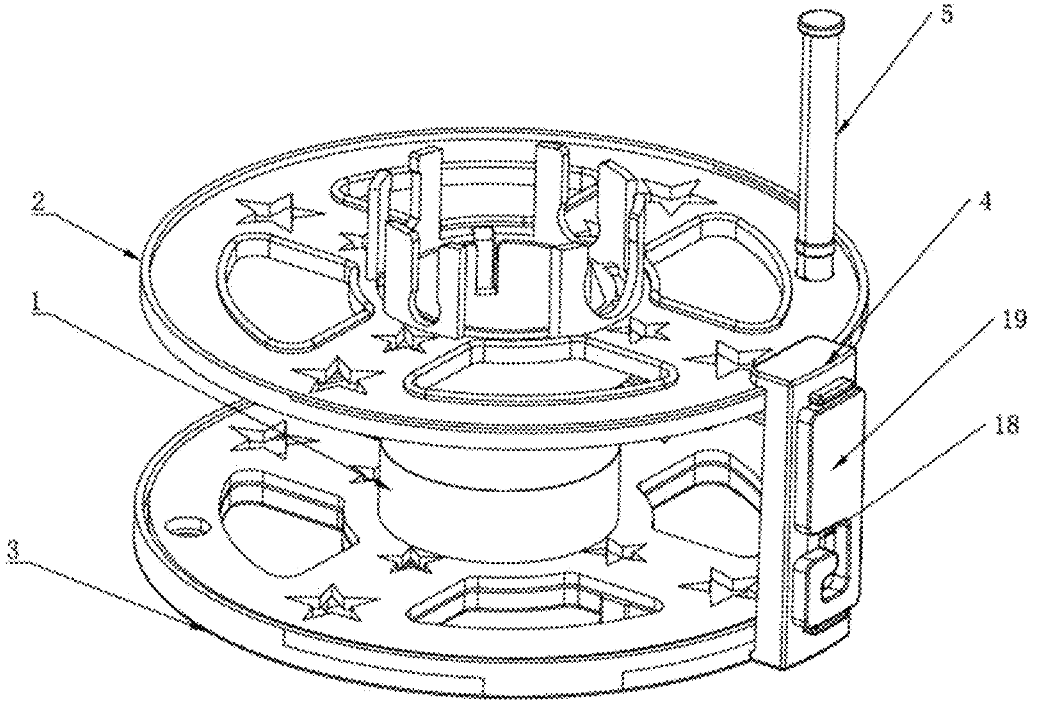
FIG. 1 is a three-dimensional diagram of a simple and portable camping light according to the present disclosure.

In the drawings: 1: winding reel; 2: first wire winding disk; 3: second wire winding disk; 4: winding disk clamp; 5: wire tightening shaft; 6: upper reel body; 7: lower reel body; 8: rotary plate; 11: plugging buckle; 12: plugging buckle groove; 13: wire outlet slot; 14: rotating buckle; 15: rotating buckle groove; 16: fixing part; 17: protrusion; 18: slot; 19: light string connection plate; 20: groove; 21: through hole; and 22: hollow structure.

DETAILED DESCRIPTION OF THE DRAWINGS AND THE PRESENTLY PREFERRED EMBODIMENTS

Figure 2:
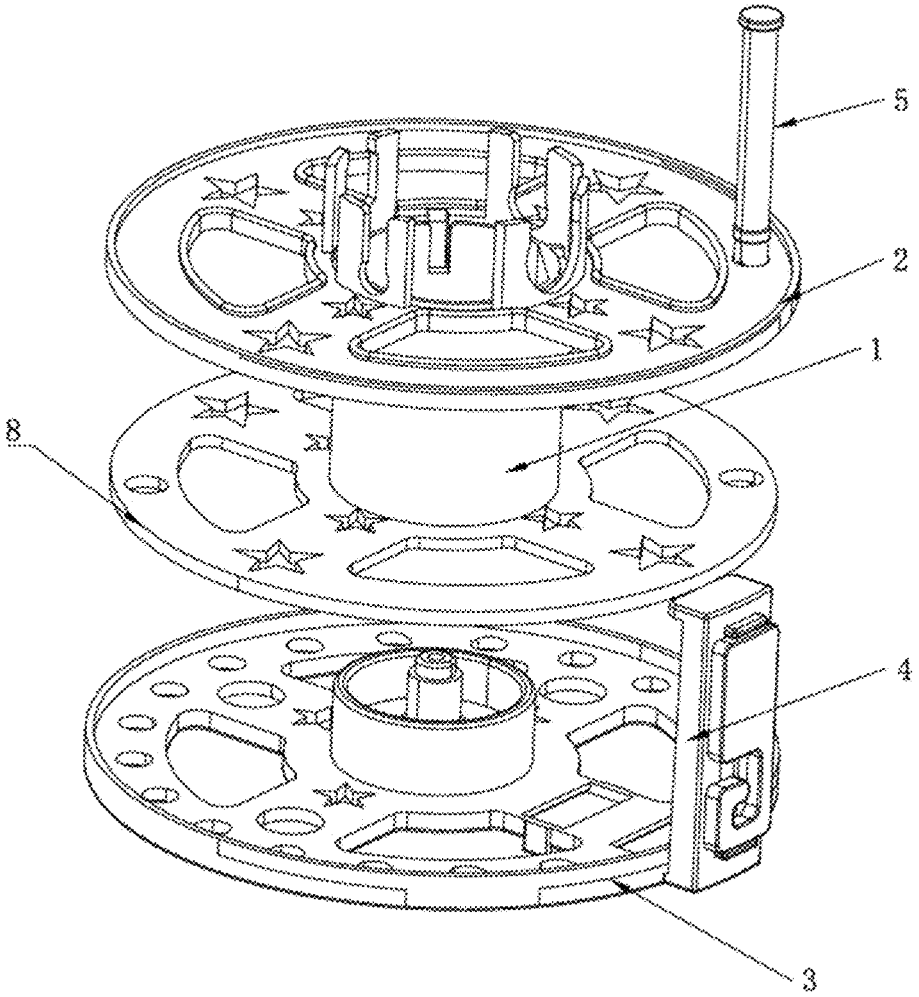
FIG. 2 is an exploded view of Embodiment 1 of a simple and portable camping light according to the present disclosure.
Figure 3:
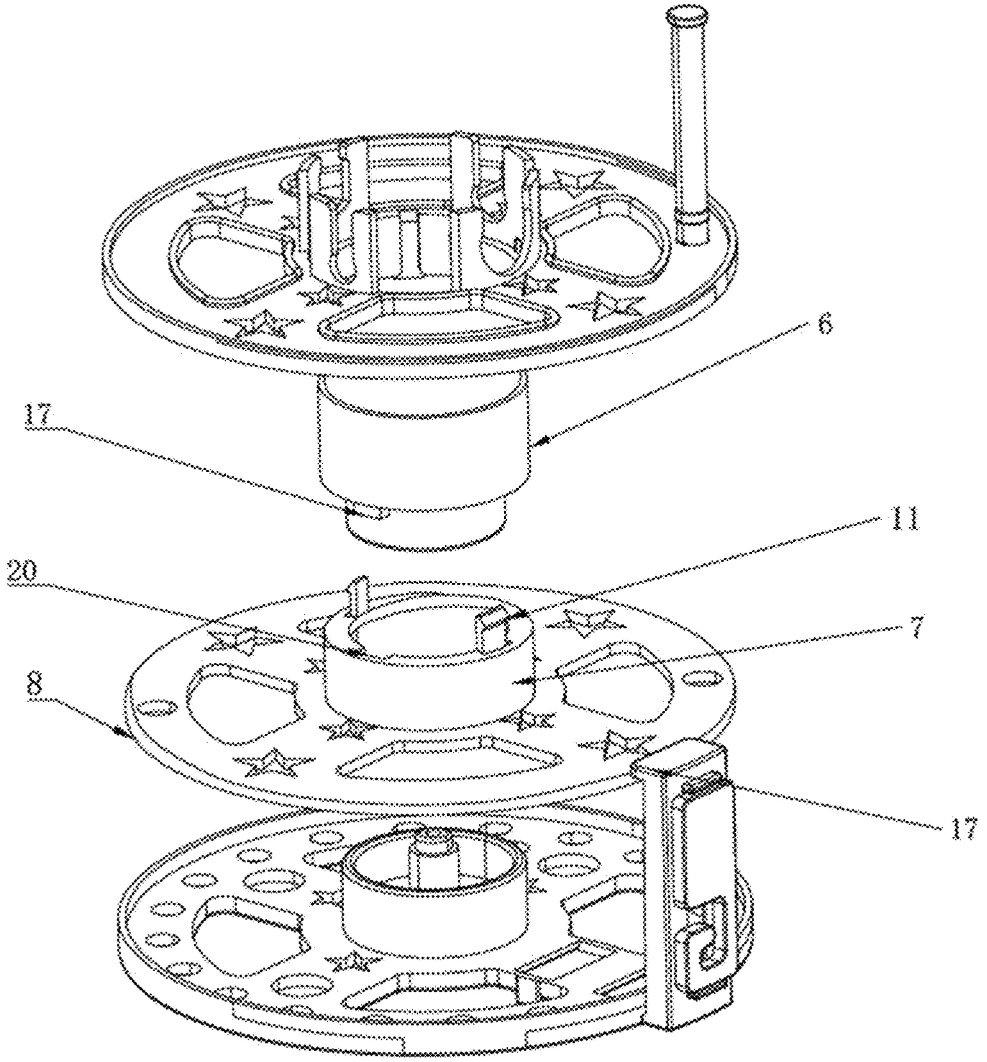
FIG. 3 is an exploded view of Embodiment 2 of a simple and portable camping light according to the present disclosure.
Figure 4:
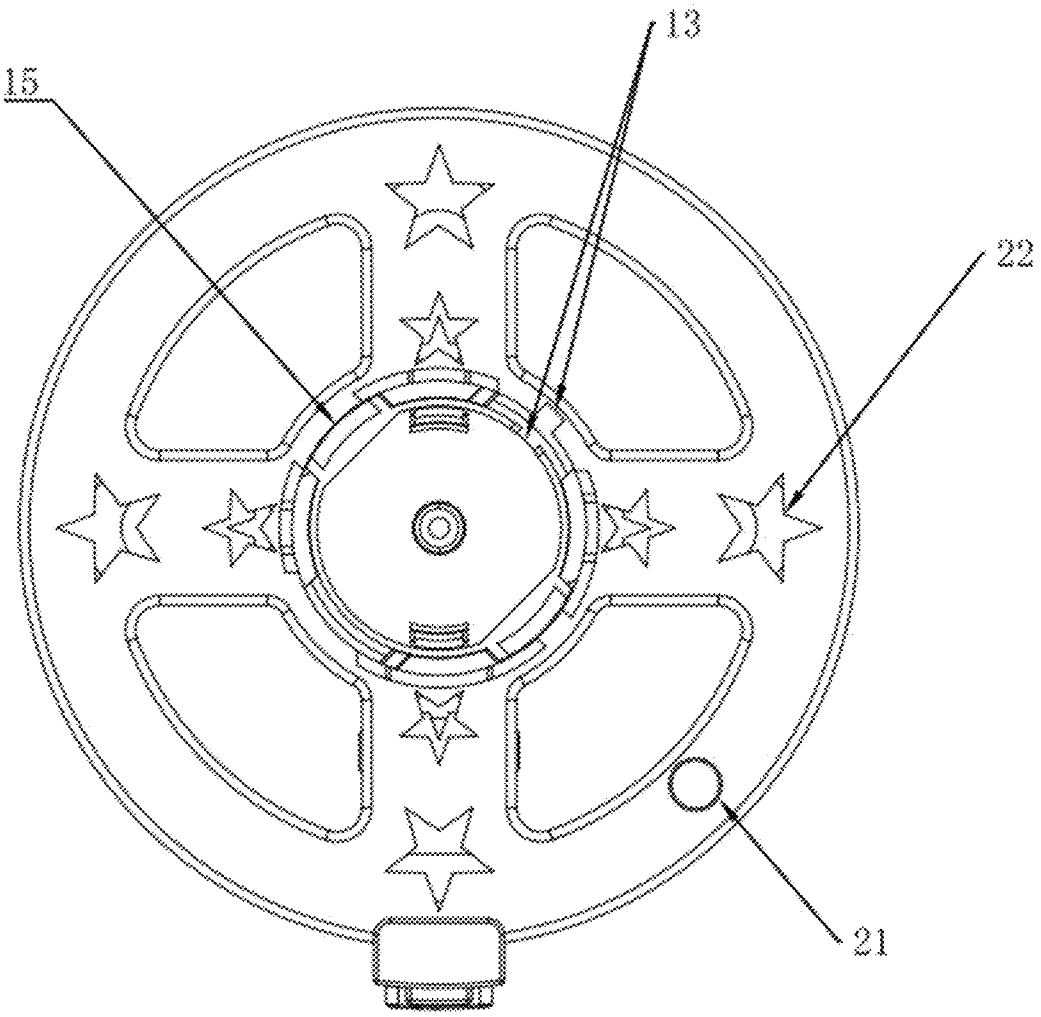
FIG. 4 is a top view of a simple and portable camping light according to the present disclosure.
Figure 5:
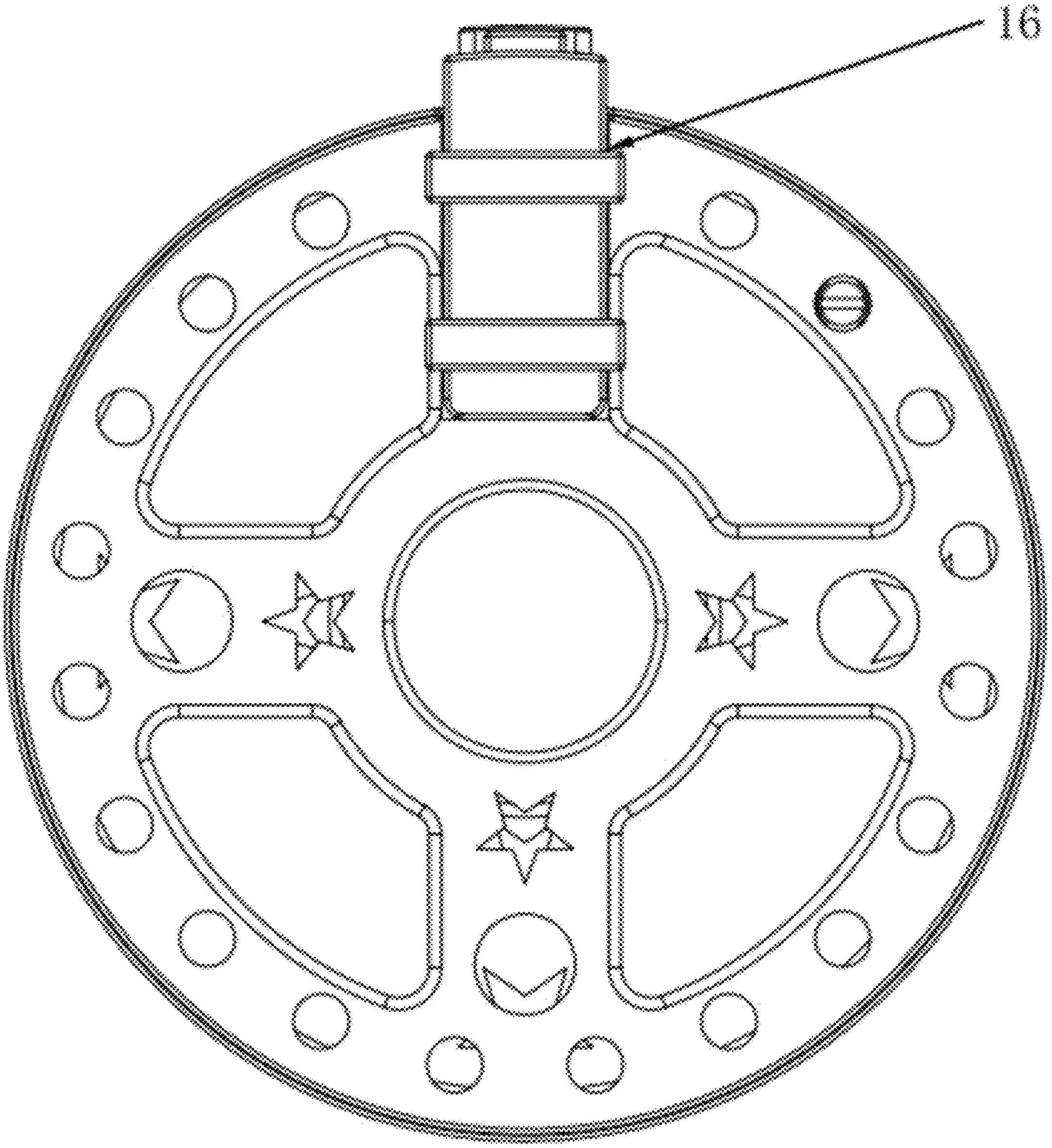
FIG. 5 is a bottom view of a simple and portable camping light according to the present disclosure.
Figure 6:
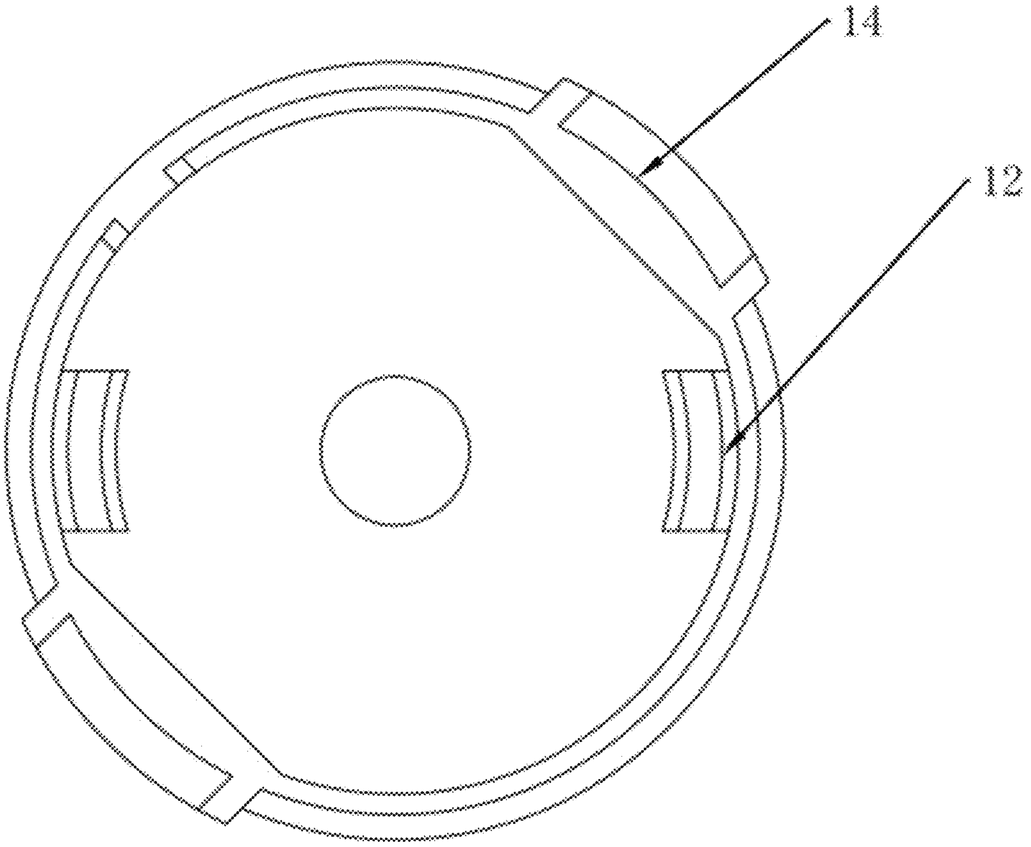
FIG. 6 is a schematic structural diagram of an upper reel body in Embodiment 2 of a simple and portable camping light according to the present disclosure.

Referring to FIG. 1 to FIG. 6, a further explanation is made to the embodiments of a simple and portable camping light according to the present disclosure.

For ease of explanation, spatial relative terms such as "up", "down", "left", and "right" are used in the embodiments to illustrate a relationship between one element or feature shown in the figures and another element or feature. It should be understood that in addition to the orientations shown in the figures, the spatial terms are intended to include different orientations of a device during use or operation. For example, if the device in the figures is placed upside down, an element described as being located "below" another element or feature will be positioned as being "above" the another element or feature. Therefore, the exemplary term "down" can include both up and down orientations. The device can be positioned in other ways (rotated 90 degrees or in other orientations), and the spatial relative explanations used here can be explained correspondingly.

Moreover, relational terms such as "first" and "second" are only used to distinguish one component from another with the same name, without necessarily requiring or implying any actual relationship or order between these components.

A simple and portable camping light includes a winding reel 1 for collecting a light string, a first wire winding disk 2 and a second wire winding disk 3 which are oppositely arranged on the winding reel 1 in an up and down manner, a winding disk clamp 4 arranged between the first wire winding disk 2 and the second wire winding disk 3, and a wire tightening shaft 5 arranged on the first wire winding disk 2. A rotary plate 8 matched with the second wire winding disk 3 is arranged at a bottom end of the winding reel 1. The rotary plate 8 is fixedly connected to the winding reel 1. The second wire winding disk 3 is detachably connected to the winding reel 1. Orderly collection of a light string is achieved. Due to the cooperation of the winding reel 1, the first wire winding disk 2, the second wire winding disk 3, and the winding disk clamp 4, it can be convenient to arrange and store the light string, making the light string convenient to carry and use. Due to the fixed connection between the rotary plate 8 and the winding reel 1 and the ability of the second wire winding disk 3 to rotate relative to the first wire winding disk 2, it is smoother to rotate the winding disk and tighten and loosen the light string. A power source device can be mounted on the first wire winding disk 2, which is convenient to assemble and maintain and has good practicability.

Preferably, through holes 21 are provided in a peripheral side of the first wire winding disk 2, and matching through holes 21 are provided in the rotary plate 8 and the second wire winding disk 3. The wire tightening shaft 5 is telescopically connected to the first wire winding disk 2. When stretched downwards, the wire tightening shaft 5 is in contact with the second wire winding disk 3 to lock the winding reel. When contracted upwards, the wire tightening shaft 5 is clamped with the through holes 21 of the first wire winding disk 2 to fix the wire tightening shaft 5. A stretching and contraction function of the wire tightening shaft 5 is achieved, so that the camping light is more flexible and convenient during use and storage. When stretched downwards, the wire tightening shaft 5 is in contact with the second wire winding disk 3, so that the wire winding disk can be locked to ensure that the light string cannot be loosened during use. When contracted upwards, the wire tightening shaft 5 is clamped with the through holes 21 of the first wire winding disk 2, so that the wire tightening shaft 5 can be fixed and avoided from moving freely, which ensures the stability of the camping light.

Preferably, the winding disk clamp 4 is "L"-shaped, and a matching fixing part 16 is arranged at a bottom end of the second wire winding disk 3, so that a bottom of the winding disk clamp 4 is in plugged connection to the fixing part 16. A top of the winding disk clamp 4 is inwards provided with a protrusion 17. The first wire winding disk 2 is in contact with a corner formed by the top of the winding disk clamp 4. The winding disk clamp 4 can be stably fixed on the second wire winding disk 3 and is not easily loosened. The inward protrusion 17 at the top of the winding disk clamp 4 and the first wire winding disk 2 are in contact with the corner at the top of the winding disk clamp 4, which can further improve the stability of the winding disk clamp 4 and ensure that the winding disk clamp 4 can firmly keep the position during winding of the light string.

Preferably, a slot 18 is provided in the winding disk clamp 4, and a light string connection plate 19 is arranged inside the slot 18. The light string connection plate 19 is provided with a plug for connecting the winding disk clamp 4. The winding disk clamp 4 is provided with a limiting portion opposite to the light string connection plate, and the limiting portion is in contact with the light string connection plate 19. The winding disk clamp 4 is detachably connected to the light string connection plate 19. Due to the arrangement of the slot 18 in the winding disk clamp 4 and the arrangement of the light string connection plate 19, it can be more convenient to connect the light string to the winding disk clamp 4, which improves the stability and reliability of connection. The arrangement of the limiting portion can limit the position of the light string connection plate 19, which prevents the light string connection plate from moving or falling off during use and ensures the stability of winding of the light string.

Preferably, the first wire winding disk 2, the rotary plate 8, and the second wire winding disk 3 are all provided with hollow structures 22. The hollow structures 22 can reduce the amount of materials for the first wire winding disk 2, the rotary plate 8, and the second wire winding disk 3, thereby reducing the weight of the entire winding mechanism and facilitating carrying and use. The hollow design contributes to air circulation, which can better dissipate heat generated during work of the light string, avoid accumulation of the heat, and prolong the service life of the light string.

Embodiment 1

Preferably, the winding reel 1 in Embodiment 1 is of an integrally formed structure, and the winding reel 1 is fixedly connected to the first wire winding disk 2. The integrally formed structure makes the winding reel 1 have a higher integrity and a more stable structure, which can better protect the light string and other components inside. The winding reel 1 is fixedly connected to the first wire winding disk 2, which ensures the stability of the wire winding disk during use and avoids looseness or falling, thereby ensuring that the light string can be stably wound on the wire winding disk.

Embodiment 2

Preferably, the winding reel 1 in Embodiment 2 is of a detachable structure. The winding reel 1 includes an upper reel body 6 and a lower reel body 7. The rotary plate 8 is arranged at a bottom end of the lower reel body 7. The upper reel body 6 is detachably connected to both the lower reel body 7 and the first wire winding disk 2. The detachable structure makes it more convenient to transport and store the winding reel 1, occupies a smaller space, and is convenient to carry. The upper reel body 6 and the lower reel body 7 are detachably connected to the first wire winding disk 2, which facilitates maintenance and repair of the inside of the camping light. This design improves the flexibility of the camping light, and a user can remove or mount the winding reel 1 according to a need to meet different usage needs.

Preferably, plugging buckles 11 are arranged at two ends of the lower reel body 7, and plugging buckle grooves 12 are oppositely arranged on the upper reel body 6. The upper reel body 6 and the lower reel body 7 are connected by plugging. The upper reel body 6 and the first wire winding disk 2 are oppositely provided with wire outlet slots 13, and the wire outlet slots 13 are arranged on a peripheral side of the upper reel body 6 and an inner side of the first wire winding disk 2. Rotating buckles 14 are arranged at two ends of the upper reel body 6, and matching rotating buckle grooves 15 are provided in the first wire winding disk 2. When the rotating buckles 14 are plugged into the rotating buckle grooves 15, the first wire winding disk 2 is rotated to fix the first wire winding disk 2 and the upper reel body 6. The wire outlet slots 13 facilitate lead-out and arrangement of the light string, so that the light string can be orderly led out of the winding reel 1. Due to the cooperation between the rotating buckles 14 and the rotating buckle grooves 15, the first wire winding disk 2 and the upper reel body 6 can be firmly fixed together, which improves the stability of the whole mechanism. The connection mode is simple and reliable and is convenient for mounting and removal.

Preferably, a groove 20 is further provided in a peripheral side of the lower reel body 7, and a protrusion 17 opposite to the groove is also arranged on the upper reel body 6. The groove 20 and the protrusion 17 are plugged vertically to fix a position of the winding reel 1. The overall stability of the winding reel 1 can be improved, which ensures that the winding reel 1 does not have looseness or deformation in a winding process of the light string.

The above-mentioned embodiments are only preferred embodiments of the present disclosure and are not intended to limit the present disclosure, and the usual changes and substitutions made by those skilled in the art within the scopes of the technical solutions of the present disclosure shall fall within the protection scope of the present disclosure.

What is claimed is:

1. A simple and portable camping light, comprising a winding reel (1) for collecting a light string, a first wire winding disk (2) and a second wire winding disk (3) which are oppositely arranged on the winding reel (1) in an up and down manner, a winding disk clamp (4) arranged between the first wire winding disk (2) and the second wire winding disk (3), and a wire tightening shaft (5) arranged on the first wire winding disk (2), wherein a rotary plate (8) matched with the second wire winding disk (3) is arranged at a bottom end of the winding reel (1); the rotary plate (8) is fixedly connected to the winding reel (1); and the second wire winding disk (3) is detachably connected to the winding reel (1);

through holes (21) are provided in a peripheral side of the first wire winding disk (2), and matching through holes (21) are provided in the rotary plate (8) and the second wire winding disk (3); the wire tightening shaft (5) is telescopically connected to the first wire winding disk (2); when stretched downwards, the wire tightening shaft (5) is in contact with the second wire winding disk (3) to lock the winding reel; and when contracted upwards, the wire tightening shaft (5) is clamped with the through holes (21) of the first wire winding disk (2) to fix the wire tightening shaft (5).

2. The simple and portable camping light according to claim 1, wherein the winding disk clamp (4) is "L"-shaped, and a matching fixing part (16) is arranged at a bottom end of the second wire winding disk (3), so that a bottom of the winding disk clamp (4) is in plugged connection to the fixing part (16); a top of the winding disk clamp (4) is inwards provided with a protrusion (17); and the first wire winding disk (2) is in contact with a corner formed by the top of the winding disk clamp (4).

3. The simple and portable camping light according to claim 2, wherein a slot (18) is provided in the winding disk clamp (4), and a light string connection plate (19) is arranged inside the slot (18); the winding disk clamp (4) is provided with a limiting portion opposite to the light string connection plate, and the limiting portion is in contact with the light string connection plate (19); and the winding disk clamp (4) is detachably connected to the light string connection plate (19).

4. The simple and portable camping light according to claim 3, wherein the winding reel (1) is of an integrally formed structure, and the winding reel (1) is fixedly connected to the first wire winding disk (2).

5. The simple and portable camping light according to claim 3, wherein the winding reel (1) is of a detachable structure; the winding reel (1) comprises an upper reel body (6) and a lower reel body (7); the rotary plate (8) is arranged at a bottom end of the lower reel body (7); and the upper reel body (6) is detachably connected to both the lower reel body (7) and the first wire winding disk (2).

6. The simple and portable camping light according to claim 5, wherein plugging buckles (11) are arranged at two ends of the lower reel body (7), and plugging buckle grooves (12) are oppositely arranged on the upper reel body (6); the upper reel body (6) and the lower reel body (7) are connected by plugging; the upper reel body (6) and the first wire winding disk (2) are oppositely provided with wire outlet slots (13), and the wire outlet slots (13) are arranged on a peripheral side of the upper reel body (6) and an inner side of the first wire winding disk (2); rotating buckles (14) are arranged at two ends of the upper reel body (6), and matching rotating buckle grooves (15) are provided in the first wire winding disk (2); and when the rotating buckles (14) are plugged into the rotating buckle grooves (15), the first wire winding disk (2) is rotated to fix the first wire winding disk (2) and the upper reel body (6).

7. The simple and portable camping light according to claim 6, wherein a groove (20) is further provided in a peripheral side of the lower reel body (7), and a protrusion (17) opposite to the groove is also arranged on the upper reel body (6); and the groove (20) and the protrusion (17) are plugged vertically to fix a position of the winding reel (1).

8. The simple and portable camping light according to claim 7, wherein the first wire winding disk (2), the rotary plate (8), and the second wire winding disk (3) are all provided with hollow structures (22).

* * * * *